United States Patent [19]

Burkhardt

[11] Patent Number: 4,490,915

[45] Date of Patent: Jan. 1, 1985

[54] SEALING ELEMENT FOR ENCAPSULATED MEASURING DEVICE

[75] Inventor: Horst Burkhardt, Truchtlaching, Fed. Rep. of Germany

[73] Assignee: Dr. Johannes Heidenhain GmbH, Traunreut, Fed. Rep. of Germany

[21] Appl. No.: 487,210

[22] Filed: Apr. 21, 1983

[30] Foreign Application Priority Data

Apr. 24, 1982 [DE] Fed. Rep. of Germany ....... 3215336

[51] Int. Cl.³ ............................................... G01B 11/02
[52] U.S. Cl. ................. 33/125 R; 33/125 A; 33/125 T; 277/215
[58] Field of Search ............. 33/125 R, 125 T, 1 AA, 33/144, 125 A; 277/215, 237 A, 55, 57

[56] References Cited

U.S. PATENT DOCUMENTS

| | | | |
|---|---|---|---|
| 3,183,009 | 5/1965 | Kunel | 277/215 |
| 4,057,258 | 11/1977 | Ernst et al. | 277/12 |
| 4,170,826 | 10/1979 | Holstein | 33/125 T |
| 4,170,828 | 10/1979 | Ernst | 33/125 R |
| 4,262,423 | 4/1981 | Affa | 33/125 A |

FOREIGN PATENT DOCUMENTS

| | | |
|---|---|---|
| 2421371 | 11/1975 | Fed. Rep. of Germany . |
| 2425066 | 4/1979 | Fed. Rep. of Germany . |
| 2846768 | 4/1980 | Fed. Rep. of Germany . |

Primary Examiner—Willis Little
Attorney, Agent, or Firm—Willian, Brinks, Olds, Hofer, Gilson & Lione Ltd.

[57] ABSTRACT

An improvement is disclosed for an encapsulated measuring device used for measuring the relative position of two objects. The improvement comprises a pair of sealing lips, each secured at one edge to a housing for the measuring device, and together covering an opening in the housing. The lips each define regions of greater flexibility adjacent to regions of lesser flexibility. A follower passes through the opening between the sealing lips. The sealing lips operate to maintain a seal for the opening while permitting the follower to pass between them. The lips are constructed such that openings adjacent to the follower are minimized or eliminated, and little frictional force is exerted on the follower if it moves in the opening along a measuring direction. The result is that accurate measurement is possible while intrusion of debris into the housing is largely prevented due to the seal.

23 Claims, 9 Drawing Figures

SEALING ELEMENT FOR ENCAPSULATED MEASURING DEVICE

BACKGROUND OF THE INVENTION

The invention relates to an improved sealing element for an encapsulated measuring device, especially an incremental or absolute length or angle measuring device, designed for accurate measurement in such environments as those of a laboratory, factory or workshop.

German Pat. No. 28 46 768 discloses an encapsulated measuring device in which a scale and a scanning unit are disposed in a housing, which defines an opening extending along the measuring direction, and which is closed by means of a pair of sealing elements arranged to cover the opening in a roof pattern in the form of plastic of rubber lips. A follower passes between the sealing lips and connects the scanning unit with an object to be measured. The follower is secured to the scanning unit at one end and to a slide piece at the other end.

In the aforementioned measuring system the sealing lips serve to seal the housing as hermetically as possible. They must lie closely on the follower and, therefore, are typically of elastic construction with a high restoring force. Due to frictional forces acting on the follower as a result of the high restoring forces of the sealing lips, the follower can undergo deformations in the measuring direction which are detrimental to measuring accuracy. Deformations of the sealing lips also occur along the measuring direction, so that even when the follower is sword-shaped in cross section, small openings in the sealing lips are often formed adjacent to the follower.

Thus, there presently exists a need for an improved sealing element for such measuring devices, which will minimize deformations of the follower and of the sealing lips.

SUMMARY OF THE INVENTION

The present invention is directed to an improvement for encapsulated measuring devices used to measure the relative position of two objects. The measuring device comprises a measuring component disposed in a housing. The housing is secured to a first object and defines an opening extending along a measuring direction. A follower passes through the opening. The follower is secured to the measuring component at one end and to a second object at a second end. The improvement of this invention comprises a pair of sealing lips, each secured at one end to the housing and together covering the opening in the housing. The sealing lips define regions of greater flexibility adjacent to regions of lesser flexibility.

In this disclosure, the word "joints" is used to refer to the regions of greater flexibility (i.e., the sealing lips are most pliable at the joints). The words "articulate construction" are used to refer to an array of joints defined by the sealing lips.

An important object of the present invention is to provide an improved sealing element which forms a largely hermetic seal around the follower. According to this aspect of the invention, regions of the sealing lips separated by joints (i.e., the regions of lesser flexibility) have a significant degree of independence from one another. Hence, openings in the lips remain substantially restricted to that required for the follower to pass between the lips.

A further object of this invention is to limit or eliminate measuring errors resulting from frictional forces upon the follower. According to this aspect of the invention, the pliability of the joints permits the frictional forces of the sealing lips to be minimized as the follower moves along the measuring direction.

Both aspects of the invention are a consequence of the articulate construction of the sealing lips. The combined effect is to permit a largely hermetic seal to be maintained while measuring accuracy is not impaired.

The invention itself, together with further objects and attendant advantages, will best be understood by reference to the following detailed description taken in conjunction with the accompanying drawings.

BRIEF DESCRIPTION OF THE DRAWINGS

FIG. 2b is a cross sectional view taken along line 2b-2b of FIG. 2a.

DETAILED DESCRIPTION OF THE PRESENTLY PREFERRED EMBODIMENTS

Figure 1A:
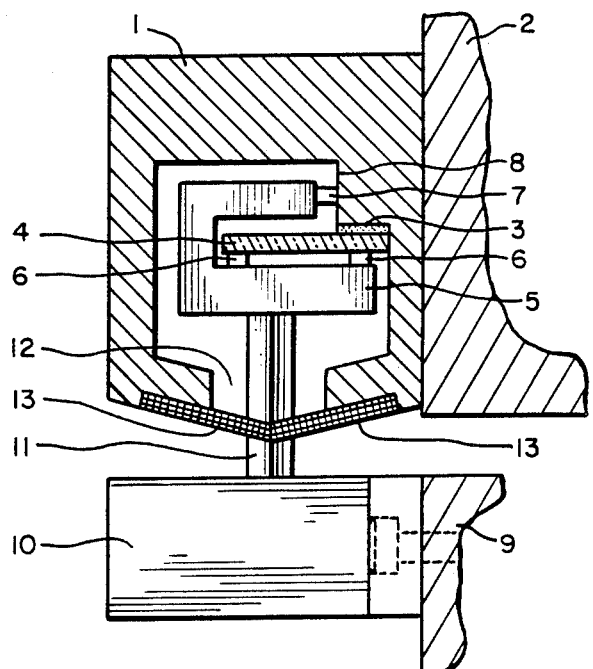
FIG. 1a is a cross sectional view of an encapsulated measuring device taken along line 1a-1a of FIG. 1b.
Figure 1B:
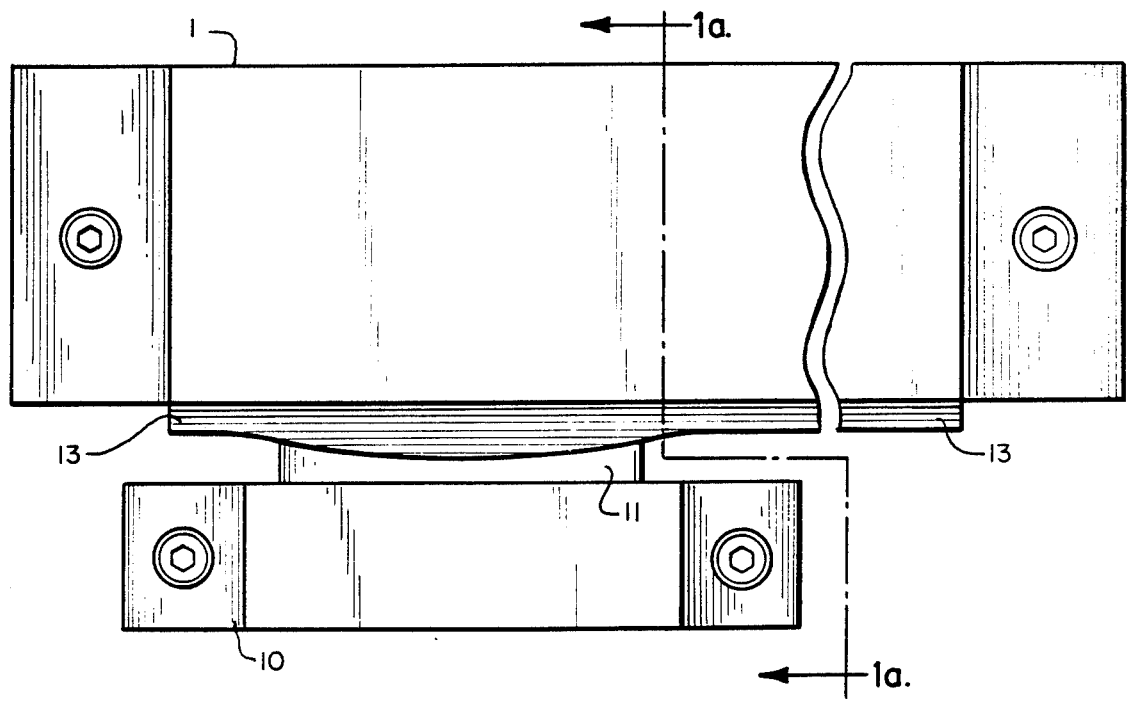
FIG. 1b is an elevational view of an encapsulated measuring device which may be used with any of the preferred embodiments of FIGS. 2a-2g.

Turning now to the drawings, FIGS. 1a and 1b show a housing 1 included in an incremental length measuring device which is fastened in an arbitrary manner to a bed 2 of a processing machine (not shown). A scale 4 is mounted to an inner surface of the housing 1, by means of an adhesive layer 3. The graduations of the scale 4 are scanned by a scanning unit 5. The scanning unit 5 defines (in a manner not shown) a scanning plate, an illuminating device and photoelectric elements. The scanning unit 5 is supported by means of rolls 6 on the scale 4 and by means of rolls 7 on a guide surface 8 of the housing 1. A mounting foot 10 is fastened in an arbitrary manner to a slide piece 9 of the processing machine. A follower 11 is attached to the mounting foot 10. The follower 11 extends through an opening 12 into the housing 1 and is connected with the scanning unit 5 for the measurement of the relative position of the bed 2 with respect to the slide piece 9. The opening 12 is closed by a pair of sealing lips 13 arranged in a roof pattern, to avoid the penetration of foreign particles or dirt into the otherwise fully closed housing 1. The follower 11 is constructed with a sword-shaped cross section, and protrudes from the housing 1 between the sealing lips 13.

Three preferred embodiments of the improved sealing lips 13 of this invention are shown enlarged in FIGS. 2a-g.

Figure 2A:
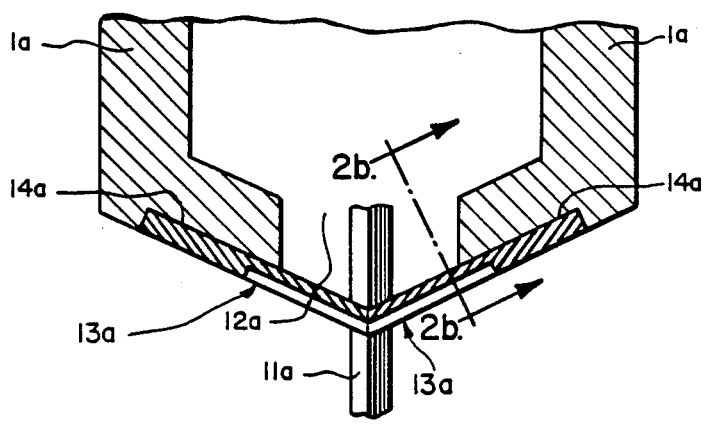
FIG. 2a is a cross sectional view of a first preferred embodiment of the sealing lips of the present invention.
Figure 2B:
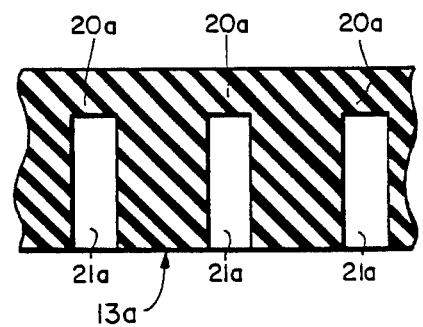

FIGS. 2a and 2b correspond to a first preferred embodiment. In FIG. 2a an opening 12a of a housing 1a is sealed by two sealing lips 13a abutting on one another in a roof form. A follower 11a passes between and is gripped by the sealing lips 13a. The sealing lips 13a are secured to outer surfaces 14a of the housing 1a adjacent to the opening 12a by adhesive means and define joints 20a. The joints 20a are formed by constructing the lips 13a such that they incorporate an array of recessed 21a, which in turn serve to define regions of decreased cross sectional thickness at selected intervals. (FIG. 2b). The recesses 21a of this preferred embodiment run perpendicular to the measuring direction and are provided essentially only adjacent to the opening 12a; the sealing lips 13a do not define recesses 21a adjacent to the outer surfaces 14a of the housing 1a. This insures that the sealing lips 13a may be securely fastened at one edge to the housing 1a.

The recesses 21a provide the sealing lips 13a with regions of greater flexibility—defined by the recesses themselves—disposed adjacent to regions of lesser flexibility (defined by regions in the lips 13a that do not include the recesses 21a).

Figure 2C:
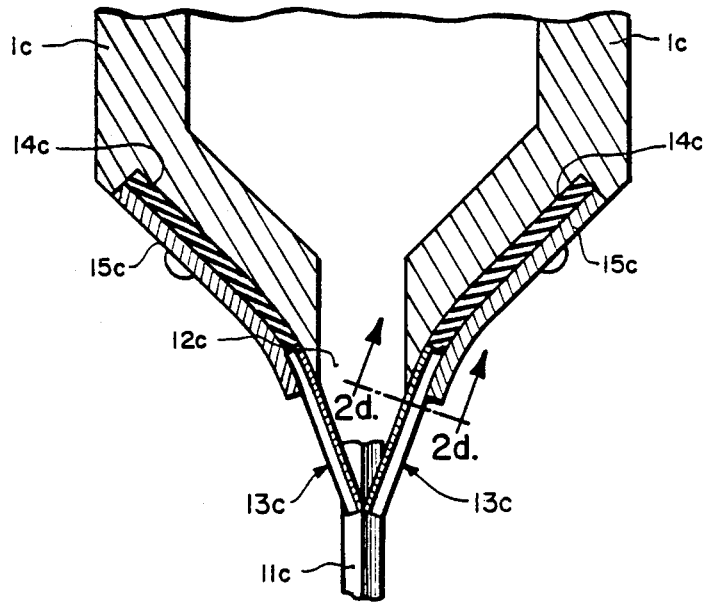
FIG. 2c is a cross sectional view of a second preferred embodiment of the sealing lips of the present invention.
Figure 2D:
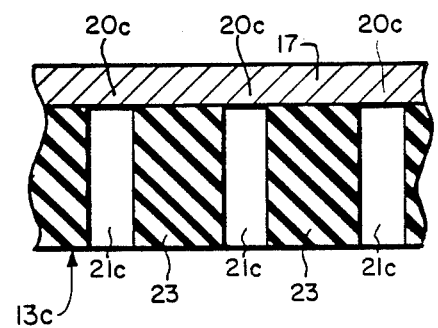
FIG. 2d is a cross sectional view along line 2d-2d of FIG. 2c.

FIGS. 2c and 2d correspond to a second preferred embodiment. In FIG. 2c an opening 12c of a housing 1c is sealed off by means of a pair of sealing lips 13c abutting on one another in a roof pattern at an acute angle, between which there passes a follower 11c. The sealing lips 13c are fastened to outer surfaces 14c of the housing 1c which are curved concavely adjacent to the opening 12c by correspondingly curved molded parts 15c. Each of the lips 13c includes a thin layer 17 which is provided with an array of reinforcing strips 23 secured at selected intervals along the layer 17. The array of strips may be secured in place, for example by gluing, to the thin layer 17. Joints 20c are formed in the thin layer 17 through recesses 21c between the reinforcing strips 23 (FIG. 2d). The array of reinforcing strips 23 is disposed such that individual strips run perpendicular to the measuring direction and are provided essentially only adjacent to the opening 12c. Adjacent to the outer surfaces 14c of the housing 1c the sealing lips 13 define a longitudinal reinforcing strip running in the measuring direction. The array of strips 23 together with the longitudinal reinforcing strip may comprise a single unit in the form of a comb which is adhesively bonded to the layer 17.

Figure 2F:
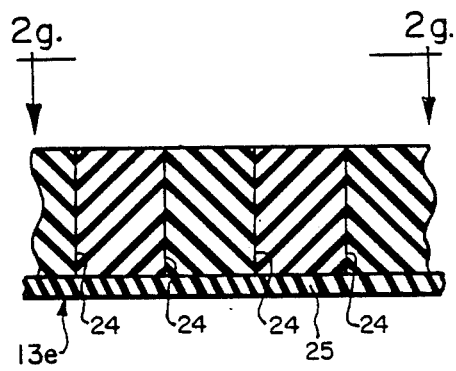
FIG. 2f is a cross sectional view taken along line 2f-2f of FIGS. 2e and 2g.
Figure 2E:
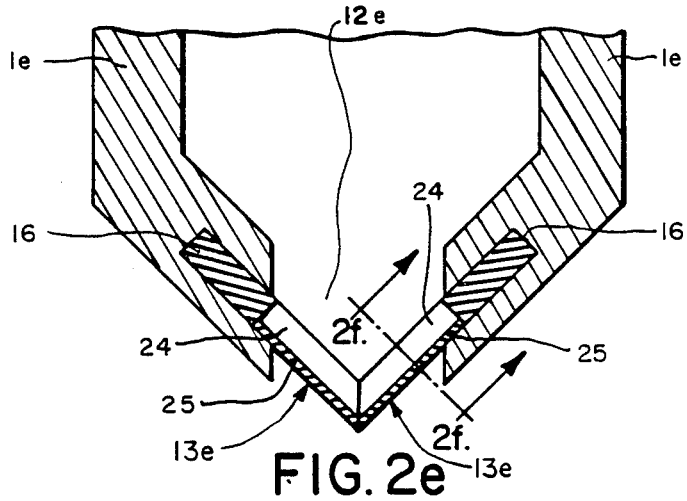
FIG. 2e is a cross sectional view of a third preferred embodiment of the sealing lips of the present invention.
Figure 2G:
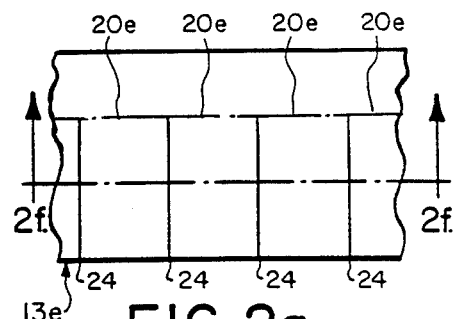
FIG. 2g shows a plan view taken along line 2g-2g of FIG. 2f.

The array of reinforcing strips 23 provides the sealing lips 13c with regions of lesser flexibility—defined by the individual strips 23 themselves—disposed adjacent to regions of greater flexibility 20c (defined by regions in the lips 13c between the individual strips 23). FIGS. 2e, 2f and 2g correspond to a third preferred embodiment. In FIG. 2e an opening 12e of a housing 1e is sealed off by means of two sealing lips 13e which abut against one another in a roof pattern. A follower (not shown) passes between and is gripped by the sealing lips 13e. The sealing lips 13e are secured at one end in grooves 16 adjacent to the opening 12e by a suitable adhesive or cement and define joints 20e which are formed by an array of incisions 24 in the sealing lips 13e at selected intervals (FIGS. 2f, 2g). Individual incisions 24 are disposed perpendicular to an outer surface of the lips 13e, and extend only partially through the lips 13e. The incisions 24 run perpendicular to the measuring direction and are provided essentially only adjacent to the opening 12e; the sealing lips 13e do not define incisions 24 adjacent to the grooves 16 of the housing 1e. The sealing lips 13e may be covered with a thin elastic layer 25 at least adjacent to the incisions 24, in order to improve the sealing action of the lips 13e and to permit the evacuation of the housing 1e.

The array of incisions 24 provides the sealing lips 13e with regions of greater flexibility—defined by the individual incisions 24 themselves—disposed adjacent to regions of lesser flexibility (defined by regions in the lips 13e between the incisions 24).

The slit-type recesses, individual reinforcing strips and individual incisions in the sealing lips can also extend in the measuring direction.

The sealing lips 13a, 13c, 13e of the preferred embodiments described above may be constructed of a flexible material, for example, a plastic or rubber. In these preferred embodiments, the joints 20 are disposed at equidistant intervals in a parallel array, and run perpendicular to the measuring direction.

As a consequence of their articulate construction, the sealing lips exert only slight frictional forces on the follower in the measuring direction, so that measuring errors caused by deformations of the follower are largely avoided. Further, the occurrence of unclosed regions adjacent to the follower is significantly reduced.

The invention is not restricted to use in encapsulated photoelectric measuring systems, but is also usable in encapsulated optical, magnetic, inductive and capacitive measuring systems. In the case of housed optical measuring devices, especially interferometers, the follower may be connected, for example according the German Pat. No. 24 21 371, with a reflector of the interferometer; and according to German Pat. No. 24 25 066 with a reflector of the interferometer and with a mirror of an autocollimator measuring system.

Of course, it should be understood that various changes and modifications to the preferred embodiments described above will be apparent to those skilled in the art. For example, the joints need not be disposed at equidistant intervals. Further, they may run along the measuring direction rather than perpendicular to it. The foregoing description of the presently preferred embodiments has been provided merely to illustrate several preferred forms of the invention, and not to limit the scope of this invention. Rather, it is intended that the scope of this invention be defined by the following claims, including all equivalents.

I claim:

1. In an encapsulated device for measuring the relative position of two objects wherein the device comprises: a housing adapted to be secured to a first object; an opening defined by the housing and extending along a measuring direction; a measuring component disposed in the housing; and a follower passing through the opening, secured to the measuring component and adapted to be secured to a second object; the improvement comprising:

a pair of sealing lips extending along the measuring direction; together covering the opening around the follower, each secured to the housing to seal the opening around the follower as the follower moves in the measuring direction along the opening, and each defining a first array of discrete regions of greater flexibility and a second array of discrete regions of lesser flexibility, such that the discrete regions of the first array are disposed in an alternating relationship with the discrete regions of the second array;

said first array of discrete regions of greater flexibility being exposed to and in fluid communication with a space located on a selected side of the housing and extending remote from the follower.

2. The invention of claim 1, wherein the regions of greater flexibility are formed by means, included in the lips, for defining regions of decreased cross sectional thickness in the lips at selected intervals.

3. The invention of claim 1, wherein each sealing lip comprises a thin layer of flexible material and an array of reinforcing strips secured at selected intervals to the thin layer, said layer and array of reinforcing strips cooperating to define the array of regions of lesser flexibility.

4. The invention of claim 1, wherein the regions of greater flexibility are defined by an array of incisions in the lips, with individual incisions disposed perpendicular to an outer surface of the lips and extending only partially through the lips.

5. The invention of claim 1, wherein the regions of greater and lesser flexibility extend along the measuring direction.

6. The invention of claim 1 wherein the regions of greater and lesser flexibility extend perpendicular to the measuring direction.

7. The invention of claim 4, wherein the incisions in the sealing lips are covered with a thin elastic layer.

8. The invention of claim 1, wherein the sealing lips comprise a flexible material.

9. The invention of claim 1, wherein the housing defines a groove extending along the measuring direction and disposed adjacent to the opening; wherein each sealing lip defines an edge extending along the measuring direction; and wherein the edge of each sealing lip is secured in the groove of the housing.

10. The invention of claim 1, wherein the housing defines an outer surface disposed adjacent to the opening; wherein said outer surface defines a flange disposed at a selected distance from the opening, said flange extending along the measuring direction and running parallel to the opening; wherein each sealing lip defines an edge extending along the measuring direction; wherein a molded part, defining a first edge and a second edge, is secured at the first edge to the flange and extends toward the opening at the second edge such that the outer surface of the housing and the molded part cooperate to form a groove; and wherein the edge of each sealing lip is secured in the groove of the housing.

11. The invention of claim 9, wherein the groove is concavely curved adjacent to the opening.

12. The invention of claim 10, wherein the groove is concavely curved adjacent to the opening.

13. The invention of claim 1 wherein the space is located within the housing.

14. The invention of claim 1 wherein the space is located exterior of the housing.

15. In an encapsulated measuring device wherein the device comprises: a housing, an opening defined by the housing and extending along a measuring direction, a scale secured to the housing, a scanning unit accommodated in the housing and movable with respect to the scale, and a follower secured to the scanning unit and extending through the opening; the improvement comprising:

a pair of sealing lips extending along the measuring direction to seal the opening around the follower as the follower moves in the measuring direction along the opening, each comprising two portions: a first portion extending along the measuring direction and secured to the housing; and a second portion disposed to cover the opening, defining a plurality of regions of greater flexibility interposed among a plurality of regions of lesser flexibility to form a regular array of joints, wherein the regions of greater flexibility run parallel to the regions of lesser flexibility, and wherein the regions of greater and lesser flexibility extend perpendicular to the measuring direction;

said array of joints effective to improve conformance of the lips against the follower and therefore sealing of the lips against the follower while simultaneously reducing friction between the lips and the follower as the follower moves in the measuring direction along the length of the lips.

16. The invention of claim 15, wherein the regions of greater flexibility are formed by constructing the lips to define regions of decreased cross sectional thickness at selected intervals.

17. The invention of claim 15, wherein the regions of greater flexibility are formed by securing an array of reinforcing strips to a thin layer of flexible material.

18. The invention of claim 15, wherein the regions of greater flexibility are formed by an array of incisions in the lips perpendicular to an outer surface of the lips, the incisions extending only partially through the lips.

19. The invention of claim 18, wherein the incisions in the sealing lips are covered with a thin elastic layer.

20. The invention of claim 15, wherein the housing defines a groove extending along the measuring direction and disposed adjacent to the opening; wherein each sealing lip defines an edge extending along the measuring direction; and wherein the edge of each sealing lip is secured in the groove of the housing.

21. The invention of claim 15, wherein the housing defines an outer surface disposed adjacent to the opening; wherein said outer surface defines a flange disposed at a selected distance from the opening, said flange extending along the measuring direction and running parallel to the opening; wherein each sealing lip defines an edge extending along the measuring direction; wherein a molded part, defining a first edge and a second edge, is secured at the first edge to the flange and extends toward the opening at the second edge such that the outer surface of the housing and the molded part cooperate to form a groove; and wherein the edge of each sealing lip is secured in the groove of the housing.

22. The invention of claim 20, wherein the groove is concavely curved adjacent to the opening.

23. The invention of claim 21, wherein the groove is concavely curved adjacent to the opening.

* * * * *